(12) United States Patent
Sakurai et al.

(10) Patent No.: US 7,771,130 B2
(45) Date of Patent: Aug. 10, 2010

(54) METHOD OF PRODUCING OPTICAL FIBER POSITIONING COMPONENT, AND OPTICAL FIBER POSITIONING COMPONENT

(75) Inventors: Wataru Sakurai, Kanagawa (JP);
Mitsuaki Tamura, Kanagawa (JP);
Hideto Furuyama, Kanagawa (JP);
Hiroshi Hamasaki, Kanagawa (JP);
Hideo Numata, Kanagawa (JP)

(73) Assignees: Sumitomo Electric Industries, Ltd., Osaka (JP); Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 11/984,675

(22) Filed: Nov. 20, 2007

(65) Prior Publication Data
US 2008/0138027 A1 Jun. 12, 2008

(30) Foreign Application Priority Data
Nov. 20, 2006 (JP) .......................... P.2006-313426

(51) Int. Cl.
*G02B 6/42* (2006.01)
(52) U.S. Cl. ........................ 385/88; 264/1.25
(58) Field of Classification Search ................... 385/88; 264/1.25
See application file for complete search history.

(56) References Cited

U.S. PATENT DOCUMENTS 6,821,027 B2 * 11/2004 Lee et al. ...................... 385/89

7,287,914 B2 * 10/2007 Fujiwara et al. ............... 385/88
2007/0053637 A1 * 3/2007 Golwalkar et al. ............ 385/88

FOREIGN PATENT DOCUMENTS

| JP | 2005-43622 | 2/2005 |
|---|---|---|
| JP | 2005-195699 | 7/2005 |
| JP | 2007-094153 | 4/2007 |
| JP | 2007-171306 | 7/2007 |
| JP | 2007-232907 | 9/2007 |

OTHER PUBLICATIONS

Sakurai et al. "A Novel Optoelectronic Ferrule for Cost-effective Optical Interconnection Modules", ECOC: Sep. 2006, Sumitomo Electric Industries, Ltd. Kawasaki Japan.
Sakurai et al. "A Novel Optoelectronic Ferrule and Easy Ribbon Fiber Splicer for Cost-effective Optical Interconnection", EPTC: Dec. 2006, Sumitomo Electric Industries, Ltd. Kawasaki Japan.
Sakurai et al. "A Novel Optoelectronic Ferrule for Optical Interconnection Modules", OECC: Jul. 2006, Sumitomo Electric Industries, Ltd. Kawasaki, Japan.

* cited by examiner

*Primary Examiner*—Jerry T Rahll
(74) *Attorney, Agent, or Firm*—McDermott Will & Emery LLP

(57) ABSTRACT

A flow of a resin which is injected for insert-molding a wiring plate into an end face of an optical fiber positioning component is regulated by regulating portions disposed in side portions of a die. Therefore, leads of the wiring plate can be prevented from being fixed while remaining to be positionally displaced by the force of the flowing resin. As a result, three-dimensional electrical wirings can be formed easily and correctly.

9 Claims, 8 Drawing Sheets

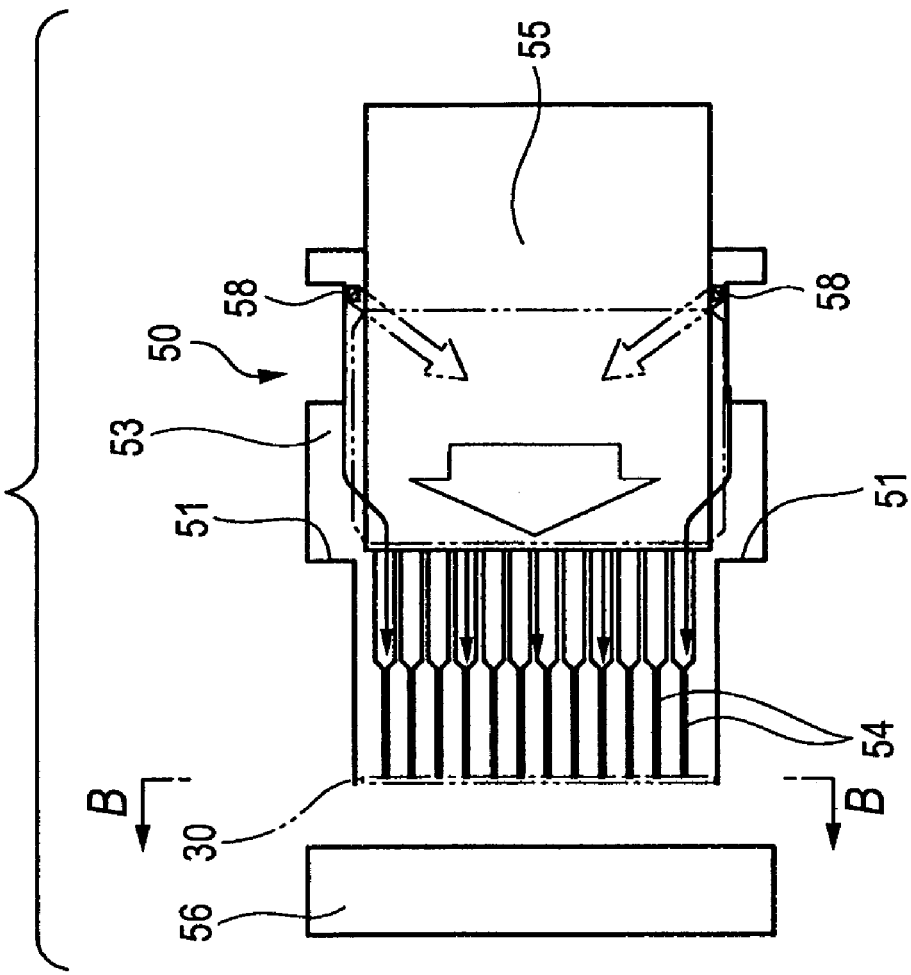
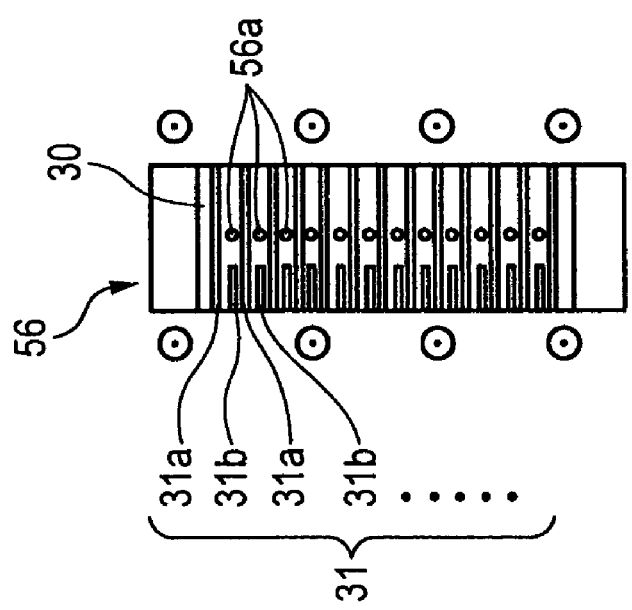

← END FACE SIDE    INJECTION PORT SIDE →

← END FACE SIDE    INJECTION PORT SIDE →

← END FACE SIDE    INJECTION PORT SIDE →

← END FACE SIDE    INJECTION PORT SIDE →

METHOD OF PRODUCING OPTICAL FIBER POSITIONING COMPONENT, AND OPTICAL FIBER POSITIONING COMPONENT

This application claims priority to Japanese Patent Application No. 2006-313426, filed Nov. 20, 2006, in the Japanese Patent Office. The priority application is incorporated by reference in its entirety.

TECHNICAL FIELD

The present disclosure relates to a method of producing an optical fiber positioning component for connecting an optical fiber with an optoelectric conversion unit. More particularly, the present disclosure relates to a method of producing an optical fiber positioning component for, for example, connecting plural optical fibers which are passed through passage holes disposed in a molded piece, with an optoelectric conversion unit which is disposed on the front face of the molded piece while being opposed to the passage holes.

RELATED ART

In accordance with development of broadband, in a router of a network node, and an information appliance, requests for increasing the speed and the capacity are expanding. To comply with this, a study for introducing optical interconnection which performs E/O conversion in an input/output portion of electrical transmission to conduct high-speed and large-capacity transmission with using broadband characteristics of an optical fiber is advancing. Therefore, a technique for coupling an optoelectric conversion element (a light emitting element, and a light receiving element) with optical fibers in an E/O converting portion is disclosed (for example, see Patent Reference 1 (Japanese Patent Unexamined Publication No. 2005-43622 (FIG. 1))).

As shown in FIG. 13, an optical fiber positioning component 100 disclosed in Patent Reference 1 has a molded piece 104 which mechanically holds optical fibers 101 in holding holes 102, and in which light input/output end faces 103 of the optical fibers 101 are exposed on the principal surface. Electric wirings 105 are disposed on the principal surface of the molded piece 104. An optical semiconductor element 107 is disposed in front of the optical fibers 101 via an insulating film 106. The optical semiconductor element 107 is connected to the electric wirings 105 by bumps 108.

In the method of producing the optical fiber positioning component which is disclosed in Patent Reference 1, it is described that, when electrical wirings are formed so as to extend on the principal and side faces of the molded piece 104, the degree of freedom of connection positions is enhanced.

However, it is difficult to correctly form three-dimensional electrical wirings on the surface of such an article in a continuous manner.

SUMMARY

Exemplary embodiments of the present invention provide a method of producing an optical fiber positioning component which enables three-dimensional electrical wirings to be realized easily and correctly.

According to one or more embodiments of the invention, a method of producing an optical fiber positioning component in which a wiring plate is insert-molded into an end face, comprises a step of using a die having a regulating portion which is disposed in at least one of side portions and regulates a flow of a resin.

According to the invention, in the method of producing an optical fiber positioning component, the regulating portion is a step disposed in the die.

According to the invention, in the method of producing an optical fiber positioning component, the regulating portion is a projection disposed in the die.

According to the invention, in the method of producing an optical fiber positioning component, the projection is formed by a columnar member embedded in the die.

According to the invention, in the method of producing an optical fiber positioning component, a corner portion of the step disposed in the die is chamfered.

Further, according to one or more embodiments of the invention, an optical fiber positioning component with a wiring plate insert-molded into an end face, which is molded by injecting a resin from both rear side portions that are opposite to the end face, comprises: a first optical fiber housing hole which is disposed inside the optical fiber positioning component and which houses one or more optical fibers; second optical fiber housing holes which is disposed inside the optical fiber positioning component and which individually house one or more optical fibers, the second optical fiber housing holes being positioned on a side of the end face with respect to the first optical fiber housing hole; and a step or recess which is disposed in at least one of side portions of the optical fiber positioning component, wherein a tip end of the first optical fiber housing hole which is on a side of the second optical fiber housing holes is on a side of the end face with respect to the step or recess which is disposed in at least one of side portions of the optical fiber positioning component.

Further, according to one or more embodiments of the invention, an optical fiber positioning component with a wiring plate insert-molded into an end face, which is molded by injecting a resin from both rear side portions that are opposite to the end face, component comprises: a first optical fiber housing hole which is disposed inside the optical fiber positioning component and which houses one or more optical fibers; second optical fiber housing holes which is disposed inside the optical fiber positioning component and which individually house one or more optical fibers, the second optical fiber housing holes being positioned on a side of the end face with respect to the first optical fiber housing hole; and a step or recess which is disposed in at least one of side portions of the optical fiber positioning component, wherein a tip end of the first optical fiber housing hole which is on a side of the second optical fiber housing holes is on a side of the end face with respect to the rear side portions, and on the side of the rear side portions with respect to the step or recess which is disposed in at least one of side portions of the optical fiber positioning component, and wherein the component satisfies $0.4 \leq 2 \times H3/(H1-H2) \leq 0.85$ where H1 is a width of the optical fiber positioning component in a direction of arranging the optical fibers, H2 is a width of the first optical fiber housing hole in the direction of arranging the optical fibers, and H3 is a size of the step or recess.

According to the invention, the regulating portion for regulating a flow of a resin is disposed on the inner side face of the die. Hence it is possible to solve the problem of the related art in that leads or the like of the wiring plate are fixed while remaining to be positionally displaced by the force of the flowing resin. Therefore, three-dimensional electrical wirings can be formed easily and correctly.

Other features and advantages may be apparent from the following detailed description, the accompanying drawings and the claims.

BRIEF DESCRIPTION OF THE DRAWINGS

FIG. 1A is a plan view showing a first embodiment relating to the method of producing an optical fiber positioning component according to the invention.

FIG. 1B is a section view taken along the line B-B in FIG. 1A.

DETAILED DESCRIPTION

Hereinafter, a first embodiment of the invention will be described in detail with reference to the accompanying drawings.

Figure 2:
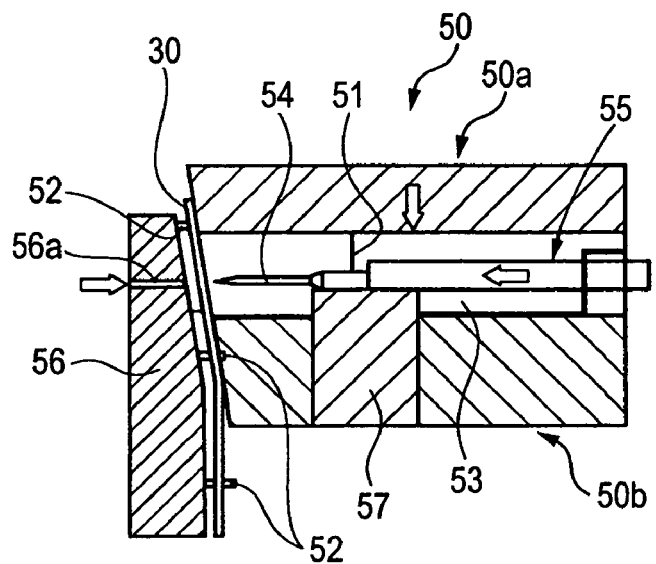
FIG. 2 is a section view showing an example of a die used in the method of producing an optical fiber positioning component according to the invention.
Figure 3:
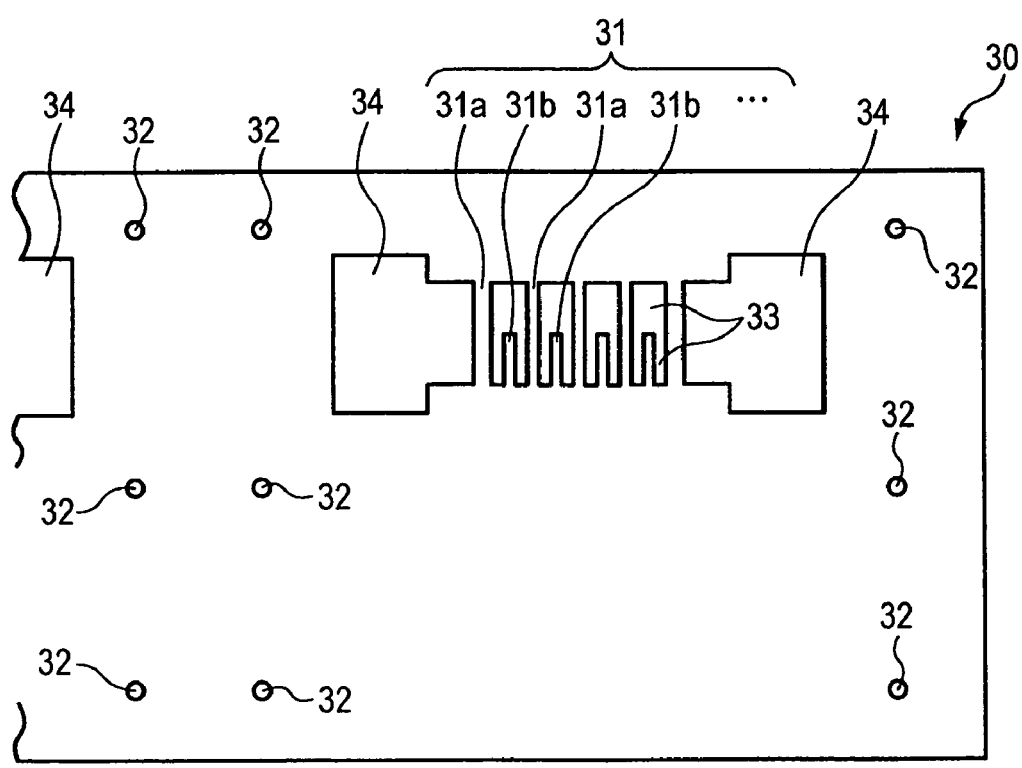
FIG. 3 is a plan view showing an example of a lead frame.
Figure 4:
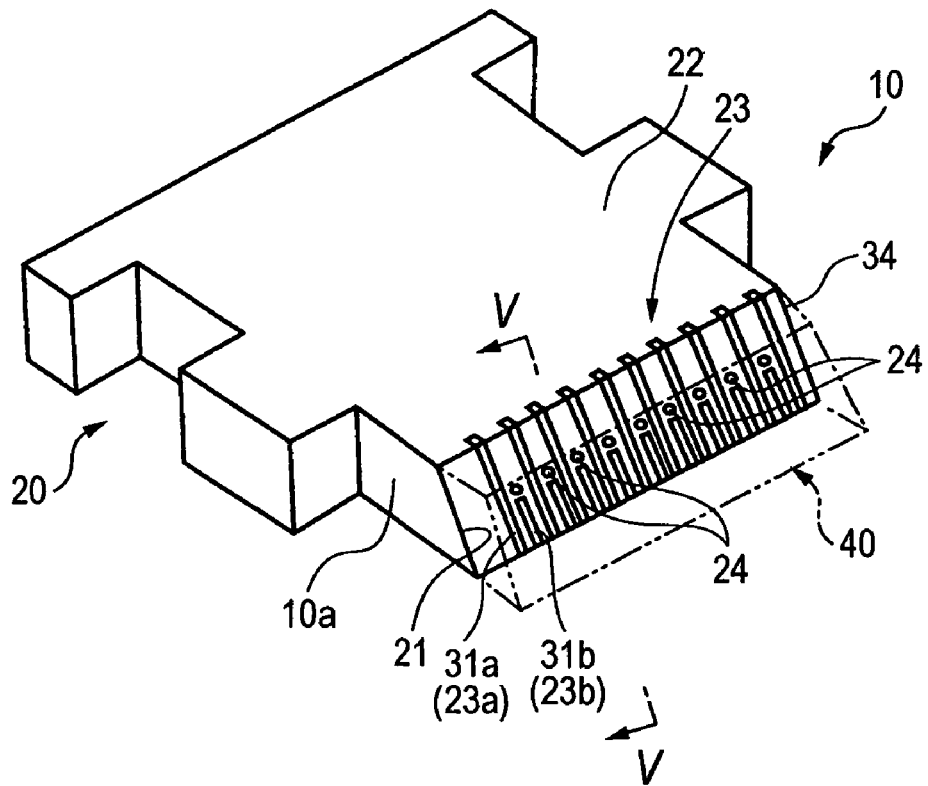
FIG. 4 is a perspective view showing an example of the optical fiber positioning component.
Figure 5:
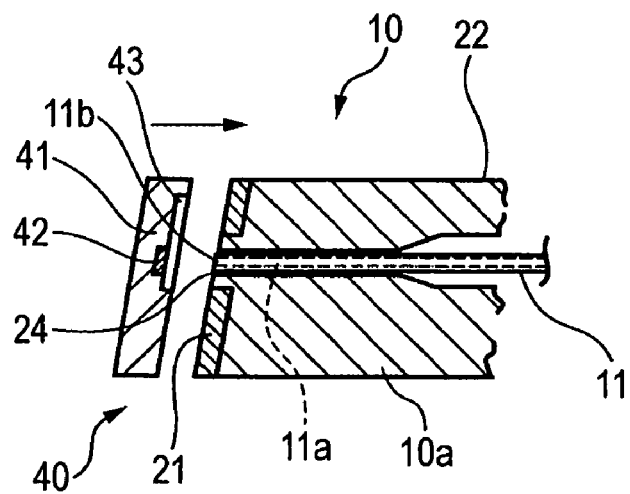
FIG. 5 is a section view taken along the line V-V in FIG. 4.

FIG. 1A is a plan view showing the first embodiment relating to the method of producing an optical fiber positioning component according to the invention. FIG. 1B is a section view taken along the line B-B in FIG. 1A. FIG. 2 is a section view showing an example of a die used in the method of producing an optical fiber positioning component according to the invention. FIG. 3 is a plan view showing an example of a lead frame. FIG. 4 is a perspective view showing an example of the optical fiber positioning component. FIG. 5 is a section view taken along the line V-V in FIG. 4.

As shown in FIG. 1, the method of producing an optical fiber positioning component which is the first embodiment of the invention is a method of producing an optical fiber positioning component 10 (see FIG. 4) in which a lead frame 30 (see FIG. 3) that is a wiring plate is insert-molded into a front face 21 that is an end face. As a regulating portion having a face for regulating a flow of a resin, for example, a step 51 is disposed in at least one of side portions of a die 50.

An example of the die used in the method of producing the optical fiber positioning component will be described. As shown in FIG. 2, the die 50 has an upper die 50a and a lower die 50b. When the upper and lower dies 50a, 50b are combined with each other, a cavity 53 for forming a main portion 10a (see FIG. 4) of the optical fiber positioning component 10 is formed inside the dies. Right and left resin injection ports 58 which communicate with the cavity 53 are disposed in a rear portion of the die 50. A step 51 is disposed on at least one (in FIG. 1, both side faces) of inner side faces of the lower die 50b. In front (the left side in FIG. 1A) of the step 51, the width of the cavity 53 is narrower than that in rear of the step 51. In front of the upper and lower dies 50a, 50b, a second slide core 56 which is opposed to a first slide core 55 is positioned by positioning pins 52. The second slide core 56 is used for forming a front face 21 on which tip end portions 11a (see FIG. 5) of optical fibers 11 are exposed, in a molded piece 20.

The first slide core 55 having core pins 54 for forming passage holes (see FIG. 5) through which the optical fibers 11 are to be passed, in the molded piece 20 is inserted between the upper and lower dies 50a, 50b. A projection 57 for adjusting the height of the first slide core 55 is disposed in a nested structure in a middle portion of the lower die 50b, in such a manner that the vertical position of the projection 57 is adjustable. During the resin injecting process, the projection 57 adjusts the height of the first slide core 55 and supports the first slide core 55 from the lower side, and, when the optical fibers 11 are to be fixed to the inside of the produced optical fiber positioning component 10, forms an adhesive agent injection port (not shown) for injecting an adhesive agent.

As shown in FIG. 2, core pin positioning holes 56a for positioning the core pins 54 are disposed in the second slide core 56. When the tip ends of the core pins 54 are inserted into the core pin positioning holes 56a, the core pins 54 are accurately positioned in the cavity 53.

As shown in FIG. 3, the lead frame 30 has a lead pattern 31 which alternately includes long leads 31a for forming long electric wirings, and short leads 31b for forming short electric wirings. The portions of the lead frame 30 between the leads 31a, 31b are cut away to be formed as spaces 33. During a molding process, therefore, the resin enters the spaces 33 so that the lead frame 30 is fixed by insert molding to the front face 21 of the molded piece 20.

Usually, many lead frames 30 are disposed continuously in the lateral direction in FIG. 3, so that, when the lead frame 30 is inset-molded, the lead frames can be continuously supplied.

Positioning holes 32 for the lead frame 30 are disposed in the periphery of the lead pattern 31. In order to allow the lead frame 30 to be correctly positioned in the vicinity of the lead pattern 31, positioning holes 34 are disposed in the lead frame 30. For example, the positioning holes 34 have a rectangular shape, and may be formed continuously from the lead pattern 31.

In the lead frame 30, for example, the lead pattern 31, the positioning holes 32, and the positioning holes 34 can be formed by etching or punching using a press.

Therefore, the lead frame 30 and the second slide core 56 are positioned and fixed by the positioning pins 52 to the front end face of the die 50 in which the upper and lower dies 50a, 50b are combined with each other. The tip ends of the core pins 54 of the first slide core 55 are inserted into the core pin positioning holes 56a of the second slide core 56, thereby positioning the core pins 54. Then, the resin is injected through the resin injection ports 58 to produce the molded piece 20. In this case, the injected resin bumps against the steps 51 disposed inside the die 50. Therefore, the resin is blocked from flowing along the inner side faces of the die 50, and the width of the cavity 53 is reduced, and hence the resin dashes toward the front portion of the die (see the arrows in FIG. 1). Since the resin flow direction is straight, positional displacement of the lead frame 30 due to deformation of the leads can be prevented from occurring. In FIG. 1B, four symbols in which a dot exists in the center of a circle are shown in each of the upper and lower sides. These symbols indicate the flow of the resin, or that the resin flows from the rear side of the sheet to the front side. Namely, the resin flow bumps perpendicularly against the rear side of the lead frame 30.

As shown in FIGS. 4 and 5, an electric wiring portion 23 is disposed on the front face 21 of the main portion 10a which is produced by the above-described production method and the die 50. In FIG. 4, for example, optical fiber passage holes 24 through which tip end faces 11b of optical fibers 11 can be exposed are disposed in the vicinities of short electric wiring portions 23b formed by the short leads 31b. Long electric wiring portions 23a formed by the long leads 31a are disposed in end portions of the electric wiring portion 23 and between the short electric wiring portions 23b. A predetermined plating process is applied to the surface of the electric wiring portion 23. Thereafter, an optical conversion unit 40 is attached and fixed to the front face 21.

As shown in FIG. 5, by contrast, optoelectric conversion elements 41 are disposed in the optical conversion unit 40. In each of the optoelectric conversion elements, an active layer 42 is opposed to and positioned with respect to the corresponding optical fiber passage hole 24 of the front face 21 of the main portion 10a. A driving electrode 43 supplies the power to the active layer 42 or receives a signal therefrom. The driving electrode 43 is disposed in the optical conversion unit 40 so that, when the optical conversion unit 40 is attached to the front face 21 of the main portion 10a, the driving electrode 43 is contacted with the electric wiring portion 23 of the main portion 10a.

According to the configuration, when the optical fiber positioning component 10 is mounted on a board (not shown) and signal lines on the board are contacted and fixed to a section (existing on the surface adjacent to the front face 21 of the main portion 10a) of the electric wiring portion 23, the power is supplied to the optoelectric conversion elements 41 via the electric wiring portion 23, so that optical signals are emitted to the optical fibers 11, and received therefrom to transmit signals. Alternatively, wirings may be performed by wire bonding on the section (existing on the surface adjacent to the front face 21 of the main portion 10a) of the electric wiring portion 23, whereby the power is supplied to the optoelectric conversion elements 41 via the electric wiring portion 23, so that optical signals are emitted to the optical fibers 11, and received therefrom to transmit signals.

In the above-described method of producing an optical fiber positioning component, the flow of the resin which is injected for insert-molding the lead frame 30 into the front face 21 of the optical fiber positioning component 10 is regulated by the steps 51 disposed in the side portions of the die 50. Unlike the related art, therefore, the leads 31a, 31b or the like of the wiring plate 30 can be prevented from being fixed while remaining to be positionally displaced by the force of the flowing resin. As a result, three-dimensional electrical wirings can be formed easily and correctly.

Figure 6A:
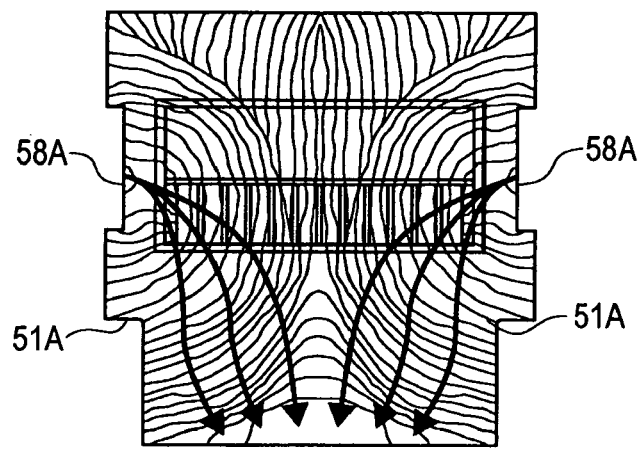
FIGS. 6A to 6C are diagrams showing a result of an analysis of a resin flow in an optical fiber positioning component.

FIG. 6A shows a result of a CAE analysis of the resin flow in the cavity in the case where an optical fiber positioning component having step portions is produced. The curves shown in FIG. 6A indicate the front face of the resin at respective timings of the process of injecting the molding resin in the cavity. A curve which is obtained by connecting lines perpendicular to the resin front faces while setting the corresponding resin injection port as a starting point indicates the direction of the resin. From the figure, it will be seen that, when step portions 51A are disposed, the width in which the resin injected from two resin injection ports 58A, 58A can flow is narrowed, with the result that the resin flows while changing the direction from an obliquely lateral direction to a vertical one (longitudinal direction). At the timing when the resin reaches the tip end, the resin flows in a direction which is approximately perpendicular to the front face of the cavity. In the case where a lead frame is placed in the front face of the cavity, a lateral force is hardly applied to the lead frame, and hence it is possible to prevent the lead from being laterally deformed.

Figure 6B:
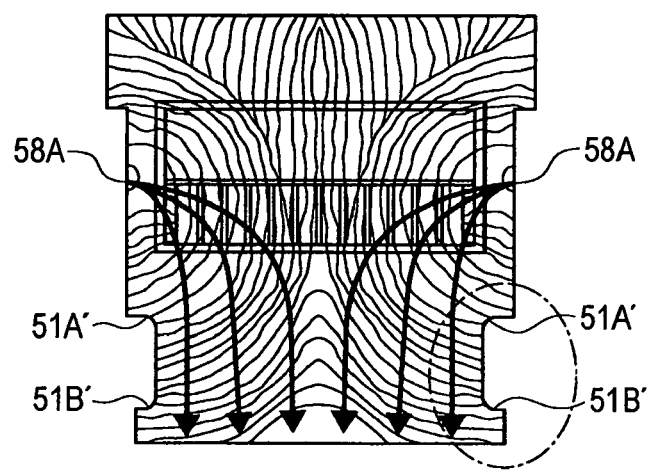
Figure 6C:
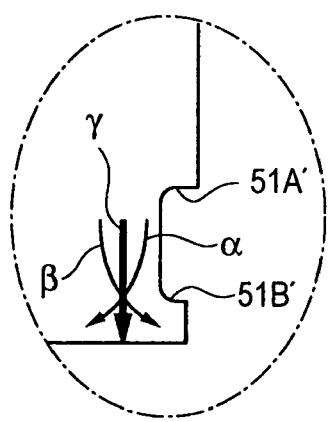

FIG. 6B shows a result of a CAE analysis of the resin flow in the cavity in the case where an optical fiber positioning component is produced while forming first and second step portions. Similar to the curves in FIG. 6A, the curves shown in FIG. 6B indicate the front face of the resin at respective timings of the process of injecting the molding resin. A curve which is obtained by connecting lines perpendicular to the resin front faces indicates the direction of the resin. When first step portions 51A' and second step portions 51B' are disposed, the resin injected from two resin injection ports 58A, 58A flows while changing the direction from an obliquely lateral direction to a vertical one (longitudinal direction). As shown in FIG. 6C, namely, a flow directed to the middle side as indicated by the arrow ax exists somewhat in the resin which passes over the first step portions 51A' and flows toward the end face (tip end) side. Therefore, the second step portions 51B' are disposed to expand the width in the optical fiber arrangement direction in front of the second step portions 51B', thereby generating a resin flow directed toward the outside as indicated by the arrow β. As a result, the flow α toward the middle is canceled, and a resin flow γ which is approximately perpendicular can be generated. At the timing when the resin reaches the tip end, the resin flows perpendicular with respect to the font face of the cavity. In the case where a lead frame is placed in the front face of the cavity, a lateral force is not applied to the lead frame, and hence it is possible to prevent the lead from being laterally deformed.

Next, a method of producing an optical fiber positioning component which is a second embodiment of the invention will be described.

Figure 7:
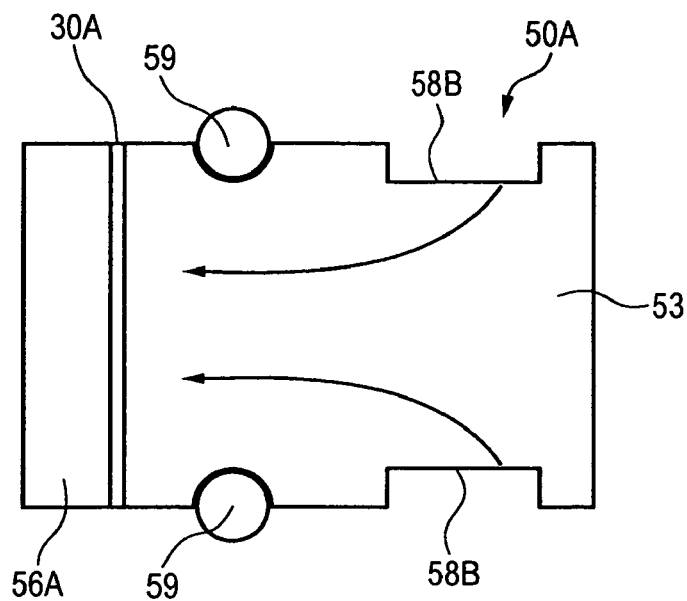
FIG. 7 is a plan view showing a second embodiment relating to the method of producing an optical fiber positioning component according to the invention.

FIG. 7 is a plan view showing the second embodiment relating to the method of producing an optical fiber positioning component according to the invention. In the method of producing an optical fiber positioning component, the regulating portion is configured by columnar projections 59, 59 which are disposed in right and left portions in a die 50A. When the projections 59, 59 are attached to the die 50A and a resin is injected into the die 50A through resin injection ports 58B, 58B, the resin flow is changed by the projections 59 from an obliquely lateral direction to a vertical one as indicated by the arrows. At the timing when the resin reaches a lead frame 30A placed between the cavity 53 and a second slide core 56A, the resin flow is perpendicular to the lead frame plane, it is possible to prevent a lateral force from being applied to the lead frame 30A.

Figure 8:
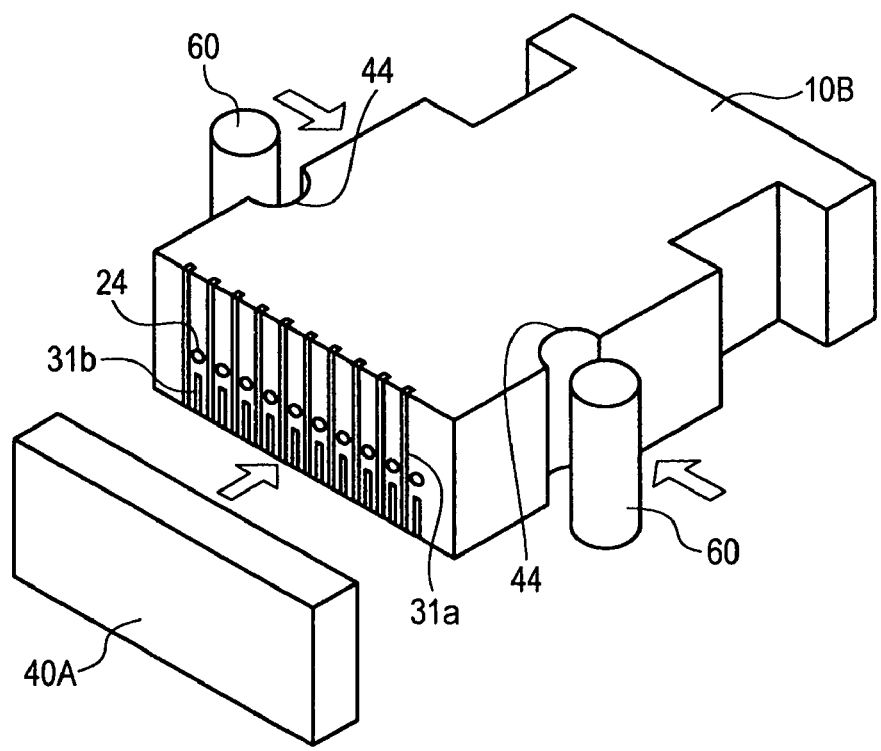
FIG. 8 is a view showing an example of an optical fiber positioning component which is produced by the production method of the second embodiment.

FIG. 8 shows an example of an optical fiber positioning component which is produced by the method of producing an optical fiber positioning component shown in FIG. 7. In the optical fiber positioning component 10B, recesses 44, 44 are formed respectively in front right and left portions, long leads 31a and short leads 31b are embedded into a tip end portion, and optical fiber passage holes 24 are formed above the short leads 31b. The surfaces of the leads are covered by a predetermined plating, so that an optical conversion unit 40A can be mounted on the tip end of the optical fiber positioning component 10B. Pins 60, 60 are fitted into the recesses 44, 44 formed in the optical fiber positioning component 10B, whereby the position of the optical fiber positioning component 10B can be fixed.

Figure 9:
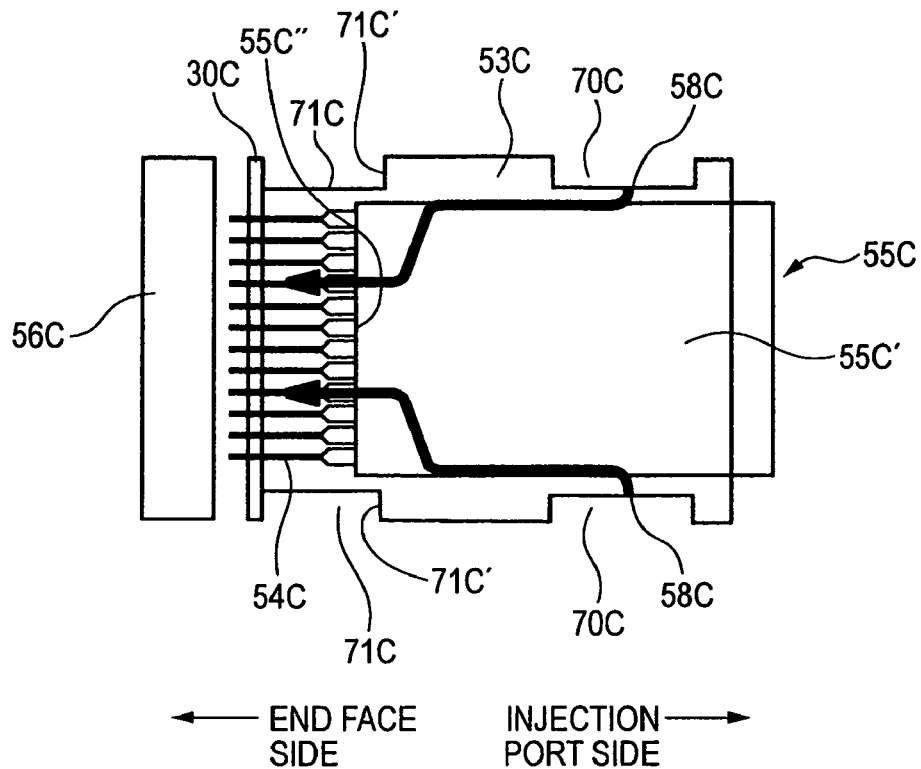
FIG. 9 is a view showing another method of producing an optical fiber positioning component according to the invention.

FIG. 9 shows another method of producing an optical fiber positioning component according to the invention. A second slide core 56C is placed so as to be opposed to the end face, and a lead frame 30C is placed on the end face or between the second slide core 56C and the tip end of a cavity 53C in the die. In the cavity 53C, recesses 70C are formed at resin injection ports 58C, but the recesses 70C do not regulate the resin flow. Alternatively, the recesses 70C may be configured by steps. Steps 71C are formed on the side of the end face of the cavity 53C. Core pins 54C are placed in the tip end of a rectangular portion 55C' of a first slide core 55C. The rectangular portion 55C' of the first slide core 55C extends to the end face side of the steps 71C. Namely, a tip end portion 55C" of the rectangular portion 55C' is on the end face side with respect to a shoulder portion 71C', and a narrow width portion is formed, thereby regulating the resin flow. When the die is used and the resin is injected through the resin injection ports 58C, the resin flows from the injection ports toward the end face as indicated by the arrows. At the timing when the resin reaches the lead frame 30C, therefore, the resin flows in the longitudinal direction, and hence it is possible to prevent the lead frame 30C from being bent.

Figure 10:
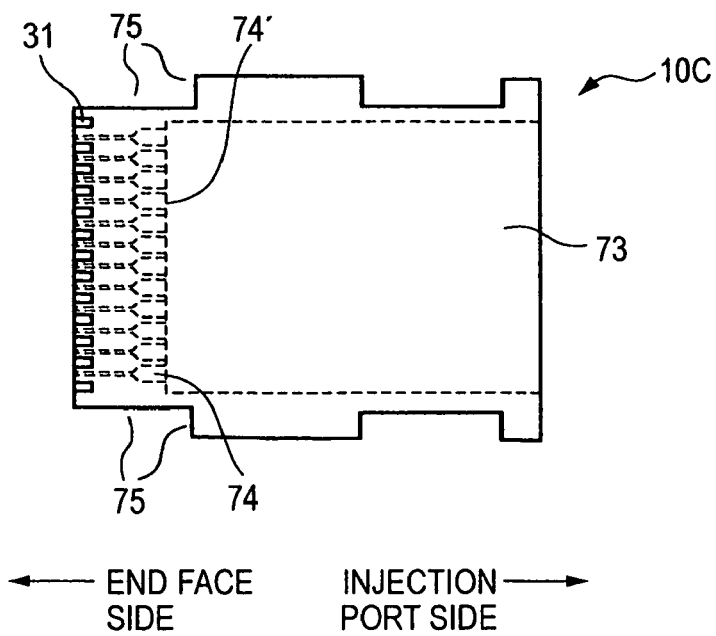
FIG. 10 is a view showing an optical fiber positioning component which is produced by using a die shown in FIG. 9.

FIG. 10 shows an optical fiber positioning component which is produced by using the die shown in FIG. 9. The optical fiber positioning component 10C comprises a first optical fiber housing hole 73 which integrally houses one or more optical fibers, in the component. The component further comprises second optical fiber housing holes 74 which are continuous to the tip end of the first optical fiber housing hole 73, which are positioned on the side of the end face of the first optical fiber housing hole 73, and each of which individually houses one or more optical fibers. The opening tip ends 74' of the second optical fiber housing holes 74 are positioned on the end face side with respect to steps 75 formed in side portions. The leads 31 are embedded into the tip end of the optical fiber positioning component 10C. In the embodiment, as shown in FIGS. 6B and 6C, the width in the optical fiber arrangement direction may be expanded in the front side of the optical fiber positioning component. The first optical fiber housing hole 73 has a rectangular section shape. The section shape is not restricted to a rectangular shape, and may be, for example, an oval shape.

Figure 11:
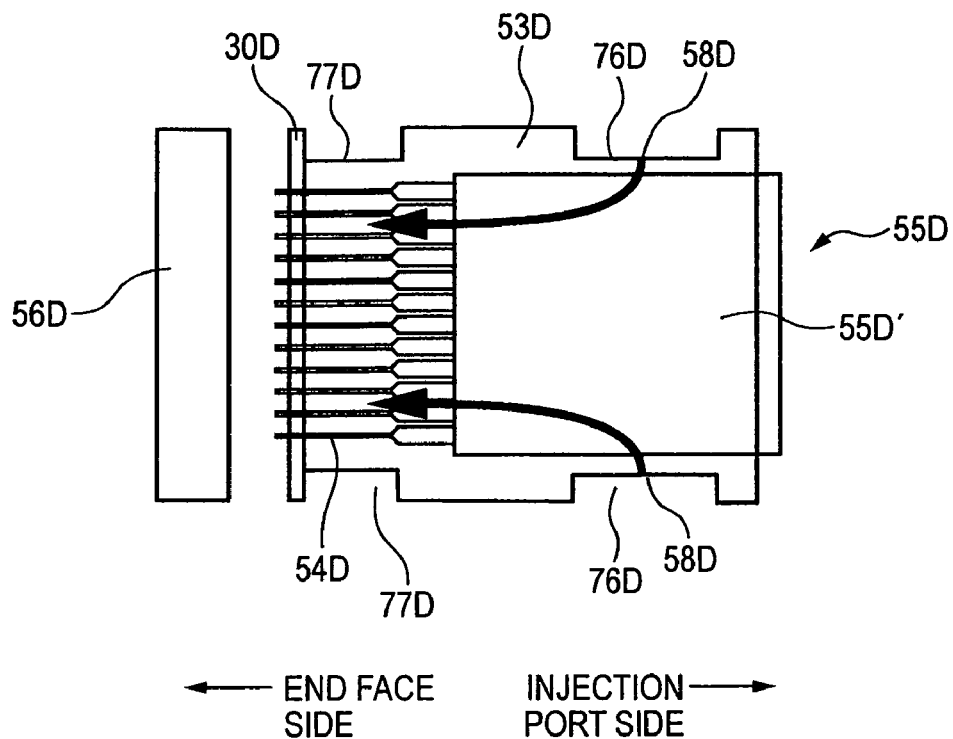
FIG. 11 is a view showing a further method of producing an optical fiber positioning component according to the invention.

FIG. 11 shows a further method of producing an optical fiber positioning component according to the invention. A second slide core 56D is placed so as to be opposed to the end face, and a lead frame 30D is placed on the end face or between the second slide core 56D and the tip end of a cavity 53D in the die. In the cavity 53D, recesses 76D are formed at resin injection ports 58D, but the recesses 76D do not regulate the resin flow. Alternatively, the recesses 76D may be configured by steps. Steps 77D are formed on the side of the end face of the cavity 53D. Core pins 54D are placed in the tip end of a rectangular portion 55D' of a first slide core 55D. The rectangular portion 55D' of the first slide core 55D extends to the injection port side of the steps 77D. When the die is used and the resin is injected through the resin injection ports 58D, the resin flows from the injection ports toward the end face as indicated by the arrows. At the timing when the resin reaches the lead frame 30D, the resin flows in the longitudinal direction, and hence it is possible to prevent the lead frame 30D from being bent.

Figure 12:
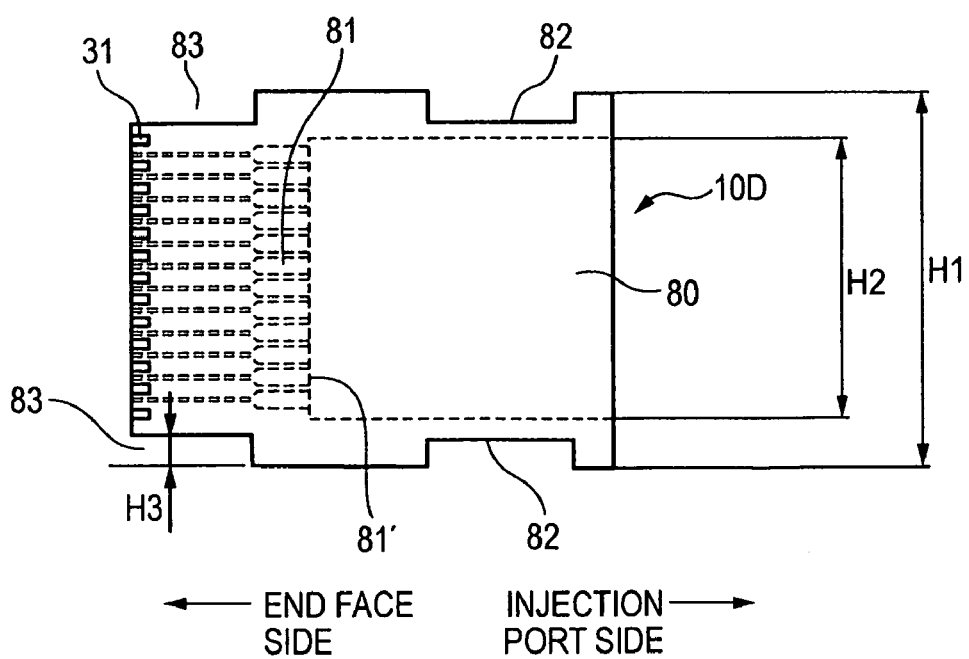
FIG. 12 is a view showing an optical fiber positioning component which is produced by using a die shown in FIG. 11.
Figure 13:
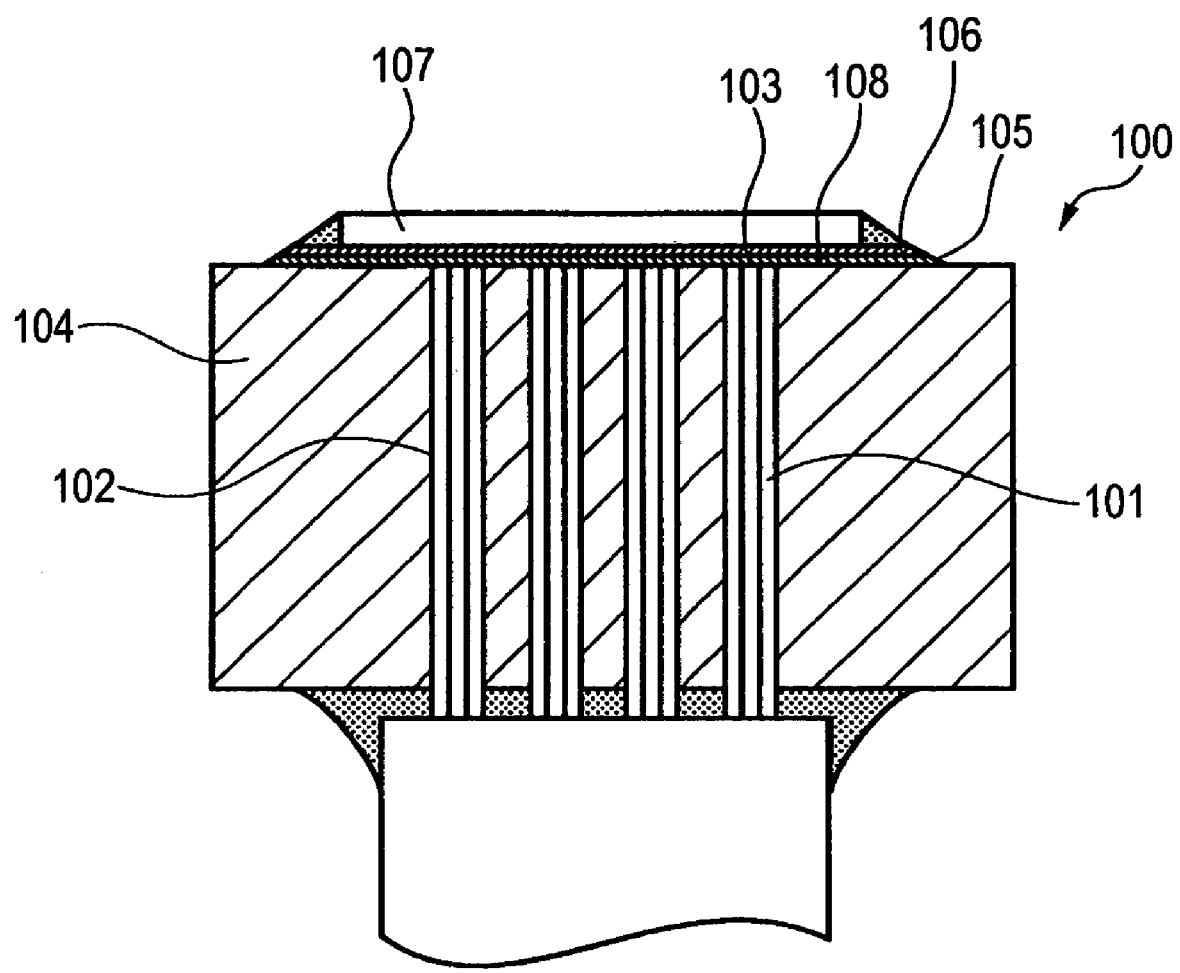
FIG. 13 is a section view of a related-art optical semiconductor module.

FIG. 12 shows an optical fiber positioning component which is produced by using the die shown in FIG. 11. The optical fiber positioning component 10D comprises a first optical fiber housing hole 80 which integrally houses one or more optical fibers, in the component. The first optical fiber housing hole 80 has a rectangular section shape. The section shape is not restricted to a rectangular shape, and may be, for example, an oval shape. The component further comprises second optical fiber housing holes 81 which are continuous to the tip end of the first optical fiber housing hole 80, which are positioned on the side of the end face of the first optical fiber housing hole 80, and each of which individually houses one or more optical fibers. The opening tip ends 81' of the second optical fiber housing holes are positioned on the end face side with respect to resin injection ports 82, and on the side of the resin injection ports with respect steps 83 formed in side portions. According to the configuration, the mechanical strength of the optical fiber positioning component 10D can be enhanced. When the flow of the resin during the production process is considered, it is preferable to satisfy $0.4 \leqq 2 \times H3/(H1-H2) \leqq 0.85$ where H1 is the width of the optical fiber positioning component 10D in the direction of arranging the optical fibers, H2 is the width of the first optical fiber housing hole 80 in the direction of arranging the optical fibers, and H3 is the size of the steps or recesses. When H1 is 4.4 mm, H2 is 3.2 mm, and H3 is 0.5, for example, the value is 0.83, and, when H1 is 4.4 mm, H2 is 3.2 mm, and H3 is 0.22, the value is 0.37. At the values, during the process of producing the optical fiber positioning component, the resin flows longitudinally, and does not bend the lead frame. The leads 31 are embedded into the tip end of the optical fiber positioning component 10D. In the embodiment, as shown in FIGS. 6B and 6C, the width in the optical fiber arrangement direction may be expanded in the end face side of the optical fiber positioning component.

The method of producing an optical fiber positioning component according to the invention is not restricted to the above-described embodiments, and may be adequately subjected to modifications, improvements, and the like.

In the above-described embodiments, for example, the step 51 or projection 59 which is the regulating portion is exposed on each of the side faces inside the die 50, or alternatively may be disposed on only one of the side faces. Alternatively, plural regulating portions may exist on one side face. When the corners of the steps are R-chamfered of C-chamfered, this configuration functions for smoothing the resin flow in the die, and hence is preferable. The projection 59 which is the regulating portion, and the recess which has a transferred shape of the projection are not restricted to have a semicircular shape, and may have a rectangular shape, a long semi-elliptical shape, or a shape which is a combination of a rectangle and a semicircle.

As described above, in the method of producing an optical fiber positioning component according to the invention, the regulating portion is disposed on a side face of the die. Therefore, the invention has an effect that it is possible to solve the problem of the related art in that leads or the like of the wiring plate are fixed while remaining to be positionally displaced by the force of the flowing resin, and three-dimensional electrical wirings can be formed easily and correctly. The invention relates a method of producing an optical fiber positioning component for, for example, connecting plural optical fibers which are passed through passage holes disposed in a molded piece, with an optoelectric conversion unit which is disposed on the front face of the molded piece while being opposed to the passage holes.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method of producing an optical fiber positioning component in which a wiring plate is insert-molded into an end face, said method comprising:
    applying a resin into a die, the die having an upper die portion and lower die portion which are combined to form a cavity, and a regulating portion which is disposed in at least one inner side face of the lower die; and
    regulating a flow of the applied resin in the cavity with the regulating portion,
    wherein the regulating portion is provided over the whole length of a thickness direction of the die.

2. A method of producing an optical fiber positioning component according to claim 1, wherein said regulating portion is a step disposed in said die.

3. A method of producing an optical fiber positioning component according to claim 1, wherein said regulating portion is a projection disposed in said die.

4. A method of producing an optical fiber positioning component according to claim 2, wherein a corner portion of said step disposed in said die is chamfered.

5. A method of producing an optical fiber positioning component according to claim 3, wherein said projection is formed by a columnar member embedded in said die.

6. An optical fiber positioning component with a wiring plate insert-molded into an end face, which is molded by injecting a resin from both rear side portions that are opposite to said end face, said optical fiber positioning component comprising:
    a first optical fiber housing hole which is disposed inside said optical fiber positioning component and which houses one or more optical fibers;
    second optical fiber housing holes which are disposed inside said optical fiber positioning component and which individually house one or more optical fibers, said second optical fiber housing holes being positioned on a side of said end face with respect to said first optical fiber housing hole; and
    a step or recess which is disposed in at least one side portion of said optical fiber positioning component,
    wherein a tip end of said first optical fiber housing hole which is on a side of said second optical fiber housing holes is on a side of said end face with respect to said step or recess which is disposed in at least one side portions of said optical fiber positioning component, and
    wherein the step or recess is provided over the whole length of a thickness direction of the optical fiber positioning component.

7. An optical fiber positioning component according to claim 6, wherein the width of said optical fiber positioning component in the direction of arranging the optical fibers is increased on the side of said end face with respect to said step or recess which is disposed in at least one of side portions of said optical fiber positioning component.

8. An optical fiber positioning component with a wiring plate insert-molded into an end face, which is molded by injecting a resin from both rear side portions that are opposite to said end face, said optical fiber positioning component comprising:
    a first optical fiber housing hole which is disposed inside said optical fiber positioning component and which houses one or more optical fibers;
    second optical fiber housing holes which are disposed inside said optical fiber positioning component and which individually house one or more optical fibers, said second optical fiber housing holes being positioned on a side of said end face with respect to said first optical fiber housing hole; and
    a step or recess which is disposed in at least one side portion of said optical fiber positioning component,
    wherein a tip end of said first optical fiber housing hole which is on a side of said second optical fiber housing holes is on a side of said end face with respect to said rear side portions, and on the side of said rear side portions with respect to said step or recess which is disposed in at least one side portions of said optical fiber positioning component,
    wherein said component satisfies $0.4 \leq 2 \times H3/(H1-H2) \leq 0.85$ where H1 is a width of said optical fiber positioning component in a direction of arranging the optical fibers, H2 is a width of said first optical fiber housing hole in the direction of arranging the optical fibers, and H3 is a size of said step or recess, and
    wherein the step or recess is provided over the whole length of a thickness direction of the optical fiber positioning component.

9. An optical fiber positioning component according to claim 8, wherein the width of said optical fiber positioning component in the direction of arranging the optical fibers is increased on the side of said end face with respect to said step or recess which is disposed in at least one of side portions of said optical fiber positioning component.

* * * * *